United States Patent
Salama et al.

(10) Patent No.: US 6,719,058 B2
(45) Date of Patent: *Apr. 13, 2004

(54) MULTIPLE SEAL DESIGN FOR COMPOSITE RISERS AND TUBING FOR OFFSHORE APPLICATIONS

(75) Inventors: Mamdouh M. Salama, Ponca City, OK (US); Brian E. Spencer, Sacramento, CA (US)

(73) Assignee: Deepwater Composites AS, Stavanger (NO)

( * ) Notice: Subject to any disclaimer, the term of this patent is extended or adjusted under 35 U.S.C. 154(b) by 64 days.

This patent is subject to a terminal disclaimer.

(21) Appl. No.: 10/010,191

(22) Filed: Dec. 5, 2001

(65) Prior Publication Data

US 2003/0106685 A1 Jun. 12, 2003

(51) Int. Cl.[7] .............................................. E21B 17/01
(52) U.S. Cl. .................... 166/367; 166/242.2; 277/602; 285/55; 285/222.1; 285/239
(58) Field of Search ................................ 166/367, 350, 166/242.2; 405/195.1; 277/602, 616, 626, 627, 652; 285/55, 239, 259, 222.1

(56) References Cited

U.S. PATENT DOCUMENTS

| 2,139,745 A | 12/1938 | Goodall ........................ 285/80 |
| 2,661,225 A | 12/1953 | Lyon et al. .................... 285/84 |
| 3,529,853 A | 9/1970 | Triest et al. ................. 285/149 |
| 3,768,842 A | 10/1973 | Ahlstone ..................... 285/55 |
| 4,290,836 A | 9/1981 | McPherson et al. ......... 156/171 |

(List continued on next page.)

FOREIGN PATENT DOCUMENTS

CA         2320028         3/2001

OTHER PUBLICATIONS

International Search Report; Mar. 10, 2003; 3 pages.

Pascinthe Saad, Ove Jahnsen, and Mamdouh M. Salama, "Application of Composites to Deepwater Top Tensioned Riser Systems," Jun. 23–28, 2002, pp. 1–7, Offshore Mechanics and Arctic Engineering.

M.M. Salama, D.B. Johnson, and J.R. Long, "Composite Introduction Riser—Testing and Qualification," Aug. 1998, pp. 170–178, SPE Production and Facilities.

Mamdouh M. Salama, Turid Storhaug, Egil Martinussen, and Ole Lindefjeld, "Application and Remaining Challenges of Advanced Composites for Water Depth Sensitive Systems," Nov. 7–9, 2000, Deep Offshore Technology 2000.

Mamdouh M. Salama, Jagannathan Murali, Donald D. Baldwin, Ove Jahnsen, and Thor Meland, "Design Consideration for Composite Drilling Riser," May 3–6, 1999, pp. 1–11, Offshore Technology Conference.

Mamdouh M. Salama, et al, "Composite Risers Are Ready For Field Applications—Status of Technology, Field Demonstration and Life Cycle Economics," Oct. 17–19, 2001, pp. 1–18, Offshore Technology Conference.

*Primary Examiner*—Hoang Dang
(74) *Attorney, Agent, or Firm*—Conley Rose, P.C.

(57) ABSTRACT

The present invention discloses multiple sealing systems for composite risers and methods of preventing interior fluid leakage to the outside of composite risers. Single or multiple elastomeric seals are formed between an elastomer applied in single or multiple grooves provided circumferentially along the outer surface of a metal to composite interface (MCI) of a liner assembly of the composite riser and an elastomeric shear ply provided on the outside of the liner assembly. The elastomeric seals and a seal between the MCI and the liner of the liner assembly provide a multiple sealing system for the composite riser to prevent leakage of interior fluids. In the event that the integrity of the seal between the MCI and liner fails or the integrity of the liner is compromised, the elastomeric seals would prevent leakage of the fluid to the outside of the composite riser.

30 Claims, 3 Drawing Sheets

U.S. PATENT DOCUMENTS

| | | | |
|---|---|---|---|
| 4,589,801 A | 5/1986 | Salama | 405/224 |
| 4,634,314 A | 1/1987 | Pierce | 405/195 |
| 4,728,224 A | 3/1988 | Salama et al. | 405/195 |
| 4,745,977 A | 5/1988 | Love et al. | 166/369 |
| 4,875,717 A | 10/1989 | Policelli | 285/149 |
| 5,105,854 A | 4/1992 | Cole et al. | 138/109 |
| 5,233,737 A | 8/1993 | Policelli | 285/390 |
| 5,288,109 A * | 2/1994 | Auberon et al. | 285/222.4 |
| 5,332,049 A * | 7/1994 | Tew | 175/320 |
| 5,378,023 A * | 1/1995 | Olbrich | 285/24 |
| 5,398,975 A | 3/1995 | Simmons | 285/93 |
| 5,439,323 A * | 8/1995 | Nance | 405/195.1 |
| 5,443,099 A * | 8/1995 | Chaussepied et al. | 138/109 |
| 5,474,132 A | 12/1995 | Gallagher | 166/367 |
| 5,483,894 A | 1/1996 | Facciano et al. | 102/293 |
| 5,944,124 A | 8/1999 | Pomerleau et al. | 175/320 |
| 5,988,300 A | 11/1999 | Pomerleau et al. | 175/320 |
| 6,042,152 A * | 3/2000 | Baldwin et al. | 285/55 |
| 6,050,612 A | 4/2000 | Wolterman | 285/259 |

\* cited by examiner

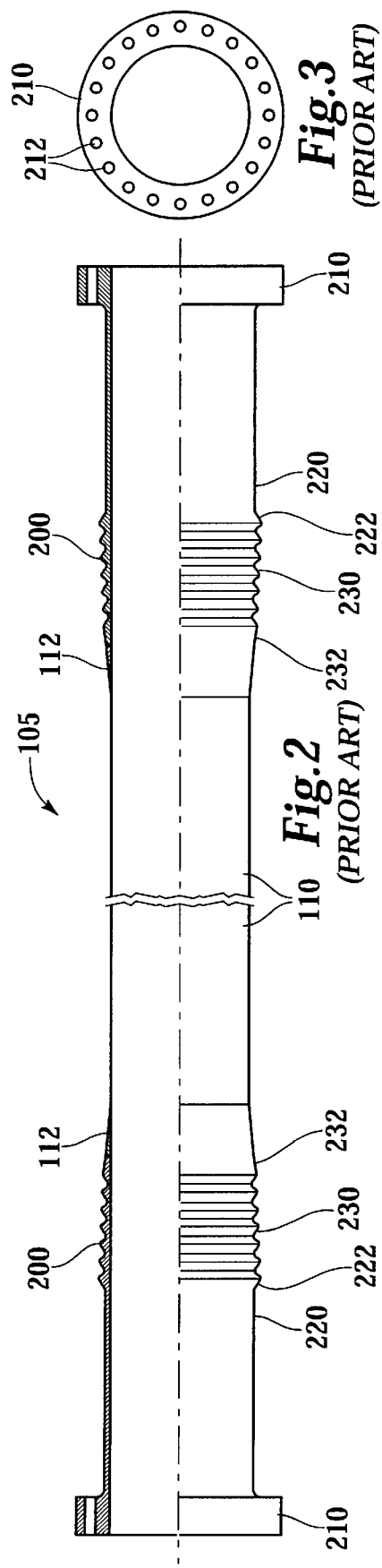

US 6,719,058 B2

MULTIPLE SEAL DESIGN FOR COMPOSITE RISERS AND TUBING FOR OFFSHORE APPLICATIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to multiple sealing systems for composite risers and methods of preventing interior fluid leakage to the outside of composite risers. More particularly, the present invention relates to an elastomer provided in single or multiple circumferential grooves on the outside of a metal to composite interface of a liner assembly for the composite riser. The elastomer in the grooves bonds with an outer elastomeric ply to provide elastomeric seals which, in combination with a seal between the metal to composite interface and a liner of the liner assembly, provides a multiple sealing system for the composite riser to prevent leakage of interior fluids.

BACKGROUND OF THE INVENTION

As exploration and production of oil and gas move into deeper water, weight, cost and reliability of water-depth sensitive systems such as risers become increasingly important. The term riser generally describes the different types of discrete pipes that extend from the seabed toward the surface of the water. These include components such as drilling risers, production risers, workover risers, catenary risers, production tubing, production risers, choke and kill lines and mud return lines. Risers can be constructed of metal and, more particularly, of steel. More recently, composite risers are being considered.

The advantages that composites offer to deepwater risers are high specific strength and stiffness, lightweightedness, corrosion resistance, high thermal insulation, high damping and excellent fatigue performance. Capitalizing on these and other advantages for composite riser applications can result in lower system cost and higher reliability for deepwater developments. Efforts have been devoted during the recent years to assess the full potential of composite materials for deepwater riser applications. The cost savings and enabling capability of composite risers for deepwater drilling and production operations are particularly appealing.

Conventional composite risers are constructed of an outer composite material and an inner liner assembly. More particularly, in a conventional composite riser, a thin tubular metal or elastomeric liner is coaxially secured to the metal connections to form the liner assembly. An elastomeric shear ply is provided along the outer surface of the liner assembly, followed with a composite overwrap reinforcement to form the composite riser. The composite riser is heated to cure the elastomeric shear ply and the composite overwrap. An external elastomeric jacket and a layer of composite overwrap are provided over the composite assembly and thermally cured for external damage and impact protection to the composite riser. The liner assembly is necessary to prevent leakage due to the inherent cracking characteristics of the composite material. The matrix in the composite will develop micro cracks at pressures lower than those at which the composite fibers will fail. The matrix micro cracking is due to the thermal stresses induced by the curing cycle and the mechanical stresses induced during the shop acceptance pressure test of the composite riser during the manufacturing process. Thus, liner assemblies are essential in ensuring fluid tightness of composite risers to prevent leakage under the conditions of matrix cracking which is inevitable.

The integrity of the composite riser, particularly at the interface between the composite overwrap and the metal connector of the liner assembly, presents a reliability issue for composite risers. Composite risers with elastomeric liners have a seal at the termination between the metal connector and elastomeric liner which is formed by the bonding of the elastomeric material of the liner and an elastomeric material which is provided on the tip of the metal termination. The reliability of the sealing system is questionable, particularly given that environmental degradation occurs to the elastomers by the production fluids.

While elastomeric liners are acceptable for production composite risers, they are ill suited for use in composite drilling or workover risers. The likely possibility of damage to elastomeric liners by mechanical tools which are required for drilling and workover operations make the elastomeric liners undesirable for these types of operations. Thus, metal liners for composite drilling and workover risers are being considered. Metal liners also have applications as composite production risers as the metal offers better long term resistance to the production fluids than elastomers. In a conventional composite riser having a metal liner, the metal liner is welded directly to the metal connector at a section called the metal to composite interface (MCI). Alternatively, the metal liner is coaxially secured to the MCI through the use of a transition ring. The transition ring is secured at one end to the MCI and is welded at the other end to the metal liner. The ring can serve as a transition between the material of the liner and that of the MCI when different grade materials are required. For example, a liner and transition ring can be constructed of titanium, while steel can be used for the MCI. The integrity of the composite riser is, generally, dominated by the fatigue resistance of the weld between the liner and the MCI. In addition, the seal between the transition ring and the MCI is critical to the fluid tightness of the composite riser.

SUMMARY OF THE INVENTION

The present invention provides multiple sealing systems for composite risers, and methods of preventing interior fluid leakage to the outside of composite risers. The invention is applicable to composite risers having metal liners which are welded or mechanically secured to the metal to composite interface (MCI) directly or to a transition ring coupled to the MCI, and to composite risers having elastomeric liners.

One or more elastomeric seals are provided between the MCI and an elastomeric shear ply provided on the outside of the liner assembly of the composite riser. In metal lined composite risers, the elastomeric seals, in combination with the weld between the liner and MCI, or the mechanical seal between the MCI and transition ring, provide a multiple sealing system between the MCI and the metal liner to prevent leakage of interior fluids to the outside of the composite riser. In the event that the integrity of the liner welds or the mechanical seal are compromised, the elastomeric seals would prevent leakage of internal fluids. In composite risers having elastomeric liners, the elastomeric seals created between the MCI and elastomeric shear ply improve the reliability of the sealing system between the metal connector and the elastomeric liner.

The elastomerics seals comprise one or more grooves which are provided along the outer tubular surface of the MCI proximate its inboard end. An elastomer in an uncured state is injected into the elastomer grooves of the MCI. The elastomer bonds with the elastomeric shear ply provided on the outside of the liner assembly to form the elastomeric seals, as discussed in further detail below.

The elastomeric shear ply in an uncured state is applied over the entire length of the outer surface of the liner assembly, including over the MCI, the elastomer in the elastomer groove, the liner, and in specific embodiments having a metal liner assembly, over the transition ring. A composite overwrap is wound over the elastomeric shear ply to form a composite riser which is heated to cure the composite material, the elastomeric shear ply and the elastomer in the elastomer grooves. The heat bonds the elastomer in the elastomer groove with the elastomeric shear ply along their interface to form the elastomeric seals.

In a composite riser having a metal liner, the single or multiple elastomeric seals work in combination with a conventional mechanical seal between the metal liner and the MCI to provide a multiple sealing system for the composite metal lined riser. In a composite riser having a metal liner welded to the MCI, the mechanical seal is a weld.

In a composite riser having a metal liner secured to a transition ring which is coupled to the MCI, the mechanical seal comprises conforming inner and outer grooves of the MCI and transition ring, respectively, which engage to provide the seal. In this embodiment, a plurality of inner grooves is circumferentially provided along the inner surface of the MCI. Each inner groove is a mechanical interlock joint, such as for example, a Talon connector, which is used for steel tubular applications to provide a metal to metal seal. The conforming grooves of the transition ring comprise outer grooves which engage with the inner grooves of the MCI when the transition ring is fitted into the inboard end of the MCI. The conforming grooves engage to form the mechanical seal between the transition ring and the MCI and the metal liner is secured to the transition ring at its end opposite the MCI.

In a composite riser having an elastomeric liner, the single or multiple elastomeric seals between the elastomer in the outer grooves of the MCI and the elastomeric shear ply improve the reliability of the conventional sealing system provided at the termination between the metal connector and the elastomeric liner.

DESCRIPTION OF DRAWINGS

FIG. 2 is a cross-sectional view and an elevational view of a conventional liner assembly for a composite riser.

FIG. 3 is an end view of a conventional flange for composite risers.

FIG. 4 is a cross-sectional view and an elevational view of a conventional metal to composite interface (MCI) for a composite riser.

DETAILED DESCRIPTION OF THE DRAWINGS

Figure 1:
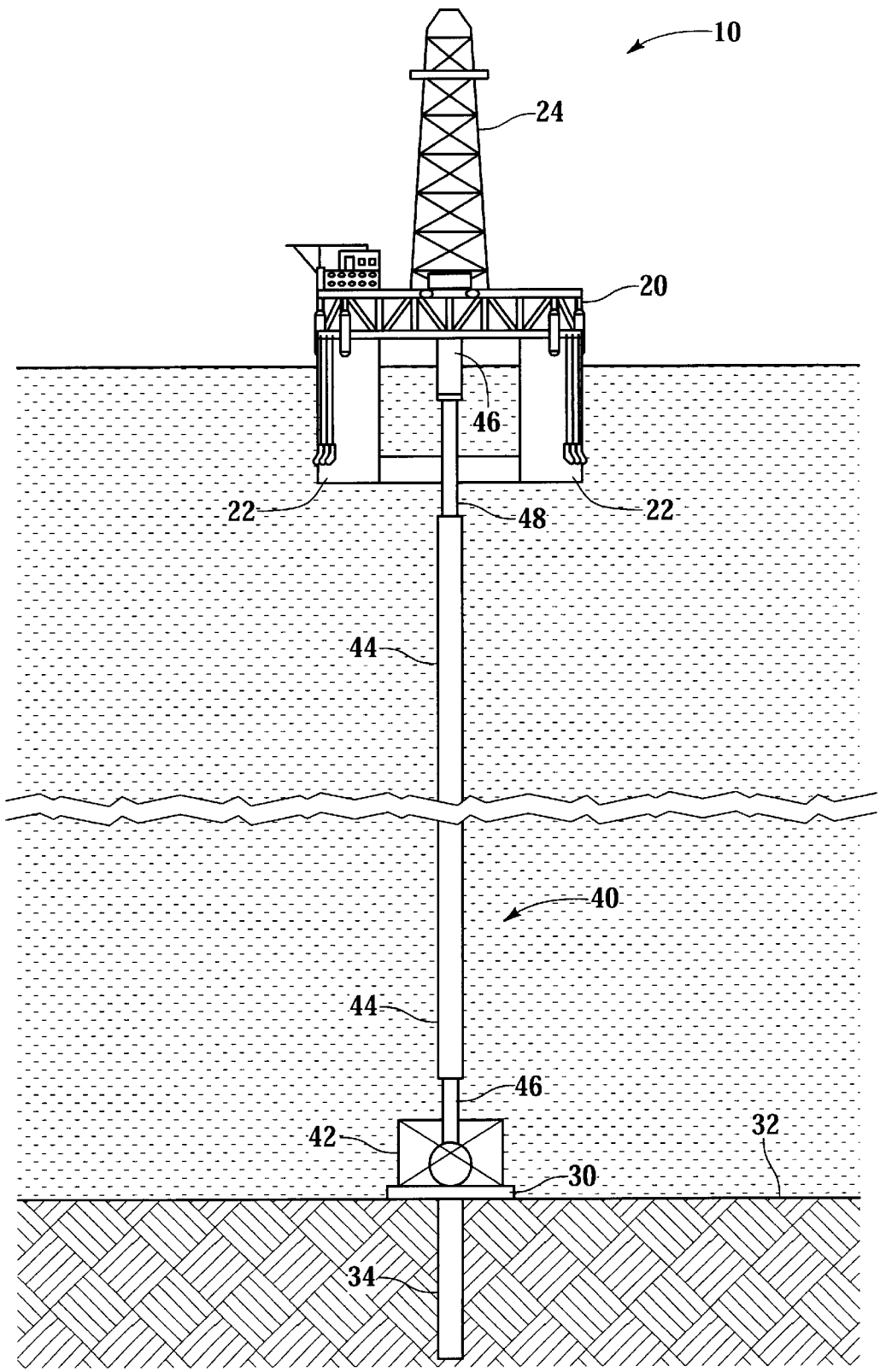
FIG. 1 is an elevational view of a schematic of an offshore drilling and production assembly.

FIG. 1 is a schematic of a conventional offshore drilling and production assembly 10 which illustrates the context of the present invention. An offshore platform 20 supports derrick 24 which is a conventional apparatus for drilling or working over a borehole and producing hydrocarbons from the borehole. Offshore platform 20 is supported by pontoons 22. A subsea platform 30 is provided on the floor of the sea 32 and a borehole 34 extends downward from the sea floor 32.

A conventional elongated riser 40 extends between borehole 34 and platform 20. Riser 40 generally comprises a tieback connector 42 proximate borehole 34 and riser sections 44 which extend between platforms 20 and 30 and are connected thereto by flex or taper joints 46 and telescoping section 48. Flex joints 46 and telescoping joint 48 accommodate the movement of platform 20 relative to subsea platform 30 and borehole 34. The elongated riser sections 44 which comprise conventional riser 40 are coaxially secured to one another. Each riser section 44 must accommodate the pressure of the fluid or gas within the section, as well as the tensile load which is caused by the suspension of additional riser sections 44 below the section, the tensioner load and the bending moments imposed by the relative movement of the platform 20 with respect to the subsea platform 30.

In a composite riser, metal connectors are coaxially secured to liners to form a liner assembly which is wrapped with an elastomeric shear ply, a composite overwrap reinforcement, an external elastomeric jacket and an outerwrap for impact and external damage protection followed in turn over the elastomeric shear ply. The composite overwrap consists of small diameter fibers (6 to 10 microns) of high strength and modulus embedded in a polymer matrix material, e.g., resins or glues. The resin materials have bonded interfaces which capture the desirable characteristics of both the fibers and the matrix. The fibers carry the main load in the composite material while the matrix maintains the fibers in the preferred orientation. The matrix also acts to transfer load into the fibers and protects the fibers from the surrounding environment. The composite material properties depend upon the two major components, the fibers and the polymeric matrix. Commonly known thermoset or thermoplastic polymeric matrices may be used. Preferred matrix materials include vinylesters and epoxies. A preferred fiber is a low cost, medium modulus (33 msi or 44 msi) polyacrylonitrile (PAN) carbon fiber. In addition, a hybrid of glass and carbon fibers incorporated in the matrix is acceptable. The fibers can also include glass fibers such as E-glass fibers.

FIG. 2 shows a conventional liner assembly 105 for a composite riser which comprises a flange extension 200 proximate each end of a tubular section of liner 110. Each flange extension 200 comprises a flange 210, a tubing section 220 and a metal to composite interface (MCI) 230. Flange 210 shown in FIGS. 2 and 3, includes a plurality of boreholes 212 along its perimeter for coaxially securing a plurality of liner sections together by aligning the boreholes of opposing flanges and securing with bolts or other means recognized in the art. Other suitable metal connector configurations commonly used in the industry are suitable for the present invention.

Tubing section 220 of flange extension 200 provides an offset between flange 210 and MCI 230. By way of example and not by way of limitation, tubing section 220 having an outer diameter of approximately 24 inches can have a length of approximately 31 inches which provides a region for maneuvering the flange assembly tools between flange 210 and MCI 230 during installation. Tubing section 220 is secured at its inboard end 222 opposite flange 210 to MCI 230. A preferred means for securing tubing section 220 and MCI 230 is by welding the ends together. Alternatively, tubing section 220 and MCI 230 can be fabricated from a continuous tubular section having inboard end 232 proximate MCI 230.

Figure 7:
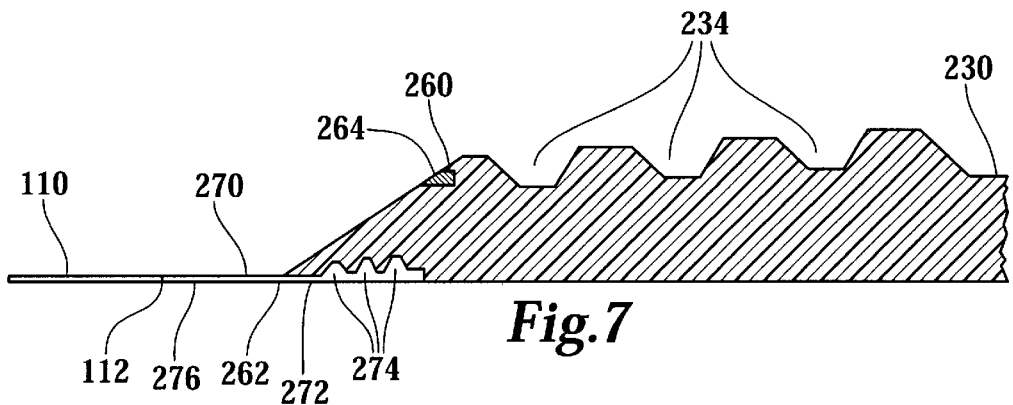
FIG. 7 is a quarter-sectional view of the embodiment of the MCI of FIG. 6 wherein the transition ring is provided.

In liner assembly 105, liner section 110 is coaxially secured to MCI 230 at the termination of inboard end 232 at liner seal 112. In a metal liner assembly, the metal liner section is secured to MCI 230 by a weld or other means recognized in the art. In another embodiment of a metal liner assembly, the metal liner section can be secured to transition ring 270 which is coupled to MCI 230, as shown in FIG. 7 and discussed in further detail below. In this embodiment, tubular transition ring 270 is coaxially secured at one end to inboard end 232 of MCI 230. The other end of transition ring 270 is secured to metal liner section 110. Transition ring 270 can be coaxially secured by welding its ends to inboard end 232 of MCI 230 and metal liner section 110 or, alternatively, can be fabricated from a continuous tubular section with MCI 230 or with metal liner section 110. In an elastomeric liner assembly, elastomeric liner section 110 is secured to MCI 230 at the termination of inboard end 232 by the bonding of the elastomeric materials of the liner section and an elastomeric material (not shown) which is provided on the tip of inboard end 232.

FIG. 4 shows a conventional composite riser 100. MCI 230 comprises a plurality of outer grooves 234 which are illustrated in a trap lock configuration. While four trap lock grooves 234 are shown, the number can vary as appropriate for the particular use. In addition, configurations other than a trap lock configuration are acceptable. Each groove 234 is a mechanical interlock joint which is fabricated into the outer surface of MCI 230. An elastomeric shear ply 300 in an uncured state is applied to the outer surface of the liner assembly 105 of FIG. 2 to provide an interface between the liner assembly 105 and a structural composite overwrap 400. Elastomeric shear ply 300 can have any suitable thickness, and the thickness can vary at particular regions of the liner assembly 105 to achieve desired characteristics. By way of example and not by way of limitation, the thickness of the elastomeric shear ply 300 can be approximately 0.09 inches over the entire length of the liner assembly, while the shear ply thickness can be reduced to approximately 0.01 inches over outer grooves 234. A thinner elastomeric shear ply interface applied over outer grooves 234 allows the surface of the grooves 234 and the shear ply 300 to move relative to the structural composite overwrap 400.

Structural composite overwrap 400 is a composite tube comprising carbon, glass or other reinforcing fibers and a thermoset or thermoplastic matrix, as previously discussed, which is fabricated over the liner assembly 105 using a filament winding process. Generally, the composite overwrap 400 is wound over the elastomeric shear ply 300 which has been applied to liner assembly 105. The composite overwrap includes helical layers that extend axially along between the MCI 230 of the composite riser and hoop layers that are applied circumferentially around the elastomeric shear ply 300. Both the helical layers and the elastomeric shear ply 300 are compacted into outer grooves 234 of MCI 230 by a layer of the fiber and matrix hoop windings of composite overwrap 400.

The filament winding process for fabricating the composite overwrap 400 over the liner assembly 105 generally described as follows. Composite overwrap 400 consists of alternating helical and hoop layers, including an initial consolidating hoop layer which is wound over the elastomeric shear ply 300. After winding each of the fiber and matrix helical layers, the layer is compacted into an outer groove 234 with hoop windings. A plurality of helical layers is then compacted into each of outer grooves 234. Localized reinforcing layers of fiber and matrix can be applied over MCI 230 and compacted into each of the outer grooves 234 to improve the load share between the grooves 234 and increase the strength of MCI 230. The thickness of the individual carbon layers may be approximately 0.03 inches. A final layer of hoop windings is wound over the entire length of the liner assembly 105, including MCI 230, thereby completing the filament winding of composite overwrap 400. Other filament winding processes recognized in the art may be suitable for the present invention.

After the filament winding is complete, the wound assembly is transferred to an oven or the oven is transferred to the assembly where heat is applied to cure the thermosetting matrix of composite overwrap 400 and elastomeric shear ply 300. After the cure, external jacket 500 of an uncured elastomeric material is applied over the entire length of resulting composite riser 100 to prevent migration of seawater into the composite wall and through the MCI interface. External elastomeric jacket 500 provides external damage protection and a degree of impact protection, mitigating damage from small dropped objects and mishandling of composite riser 100. A composite of E-glass or other reinforcing fibers such as carbon in a polymeric matrix 600 can be filament wound over the external elastomeric jacket 500 to compact the jacket during the cure and to provide scuff protection. The assembly is then heated to a suitable temperature to cure elastomeric external jacket 500 and scuff protection outerwrap 600.

Figure 5:
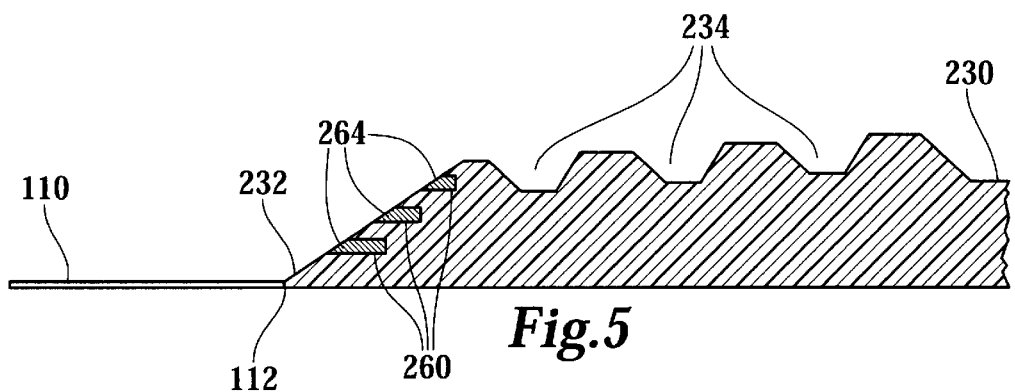
FIG. 5 is a quarter-sectional view of an embodiment of the MCI for securing to a liner wherein elastomer grooves are circumferentially provided along the outer tubular surface of the MCI.

Referring to the quarter-sectional view of MCI 230 shown in FIG. 5, liner section 110 is secured to MCI 230 at the termination of inboard end 232 at liner seal 112. As previously indicated in the discussion with respect to FIG. 2, in a metal liner assembly, the metal liner section 110 is secured to MCI 230 by a weld or other means recognized in the art. In an elastomeric liner assembly, the elastomeric liner section 110 is secured to MCI 230 by the bonding of the elastomeric material of the liner section and an elastomeric material (not shown) provided at the tip of inboard end 232 of MCI 230. One or more elastomer grooves 260 are provided circumferentially along the outer tubular surface of MCI 230 between inboard end 232 and outer grooves 234 of MCI 230. Elastomer 264 in an uncured state is applied into elastomer grooves 260 of MCI 230. Elastomer 264 is preferably injected or compacted into elastomer grooves 260, but can be applied by other methods. While three grooves are illustrated, the number of elastomer grooves 260 can vary as suitable for the particular application. For example, one elastomer groove 260 may be appropriate for certain composite riser applications. In other applications, two or more elastomer grooves may be suitable.

Figure 6:
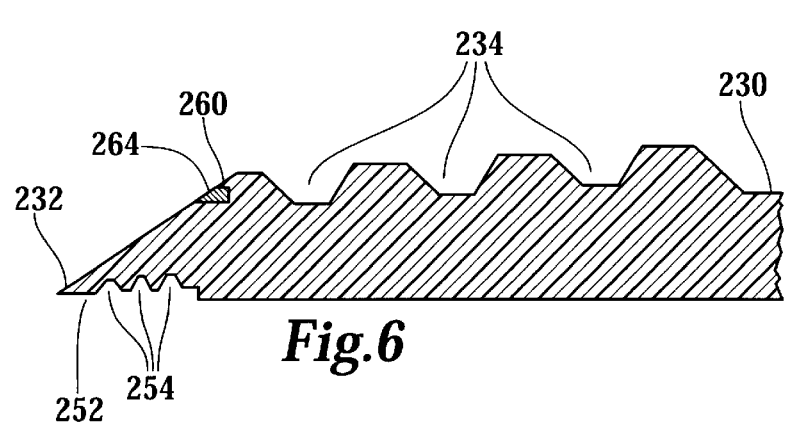
FIG. 6 is a quarter-sectional view of another embodiment of the MCI for securing to a transition ring of a metal liner assembly wherein a single elastomer groove and a mechanical seal surface are provided.

Turning to FIGS. 6 and 7, in another embodiment of a composite riser, MCI 230 and transition ring 270 for securing MCI 230 to metal liner section 110 are shown. While a single elastomer groove 260 is shown, multiple grooves can also be used as previously discussed. Elastomer groove 260 having elastomer 264 therein, is provided circumferentially along the outer tubular surface of MCI 230 between inboard end 232 and outer grooves 234 of MCI 230, similar to the embodiment discussed above for a liner section 100 secured to the inboard end 232 of MCI 230. In this embodiment, a plurality of inner grooves 254 is provided circumferentially along inner seal surface 252 of MCI 230. Each inner groove 254 is a mechanical interlock joint which is machined, wound or otherwise fabricated in the inner tubular surface of MCI 230. While inner grooves 254 are illustrated in a Talon configuration, other configurations common in the art are acceptable. Transition ring 270 having outer grooves 274 which conform to inner grooves 254 of inner seal surface 252 is fitted into inboard end 232 of MCI 230. Conforming outer grooves 274 of transition ring 270 and inner grooves 254 of MCI engage to form mechanical seal 272 therebetween. Liner section 110 is secured to transition ring 270 at inboard end 276 by a weld or other means recognized in the art.

Figure 8:
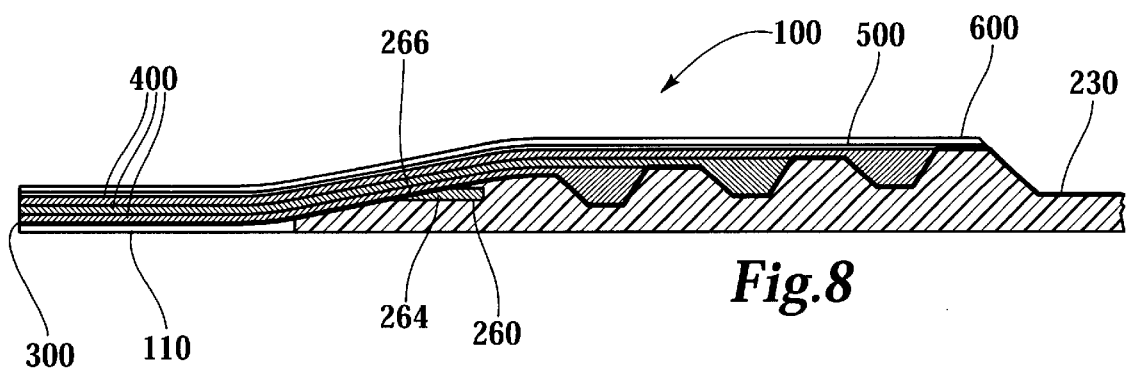
FIG. 8 is a quarter-sectional view of a composite riser MCI with composite overwrap in place.

Referring to the embodiment of the present invention shown in FIG. 8 and the previous discussion with reference to FIG. 4, elastomeric shear ply 300 is applied over the entire length of the outer surfaces of liner section 110, elastomer 264 in elastomer groove 260, MCI 230, and in embodiments having transition ring 270, over the outer surface of transition ring 270 (not shown). Structural composite overwrap 400 is wound over the elastomeric shear ply 300 as previously discussed, and the resulting composite riser 100 is heated to cure the composite overwrap 400, the elastomeric shear ply 300 and elastomer 264. The elastomeric shear ply 300 and elastomer 264 bond together along their interface to form elastomeric seal 266. Multiple elastomeric seals 266 are formed in the embodiments having multiple elastomer grooves 260.

After the composite riser 100 is cured, external jacket 500 of an uncured elastomeric material is applied over the entire length of composite riser 100, followed with a filament winding of reinforcing fibers in a polymeric matrix 600. The assembly is heated to a suitable temperature to cure elastomeric external jacket 500 and polymeric matrix 600 thereby providing protection of the composite riser line assembly from external damage and impact protection.

Single or multiple elastomeric seals 266 provide a multiple sealing system for composite riser 100, in combination with the seal formed between liner section 110 and MCI 230. In composite risers having a metal liner assembly using a transition ring 270, elastomer seals 266 provide a multiple sealing system in combination with mechanical seal 272 formed between the conforming inner and outer grooves 254, 274 of MCI 230 and transition ring 270, respectively, and the weld between metal liner section 110 and transition ring 270. Elastomeric seals 266, liner seal 112 between liner section 110 and MCI 230, and mechanical seal 272, prevent fluids or gases within the composite riser 100 from leaking to the outside. However, in the event that the integrity of liner 110, liner seal 112 or mechanical seal 272 is compromised, elastomeric seals 266 would prevent fluid or gases from leaking to the outside of composite riser 100. For example, in composite risers where liner seal 112 between MCI 230 and liner section 110, or between transition ring 270 and liner section 110 fails, or mechanical seal 272 fails, fluids or gases within liner assembly 105 would migrate through the failed liner section 110, liner seal 112 or mechanical seal 272, and under elastomeric shear ply 300. Elastomer seals 266 between elastomer 264 of elastomer groove 260 and elastomeric shear ply 300 would minimize or prevent the fluids or gases from escaping to the outside of the composite riser 100. Thus, the use of elastomeric seals 266 in a composite riser would increase the reliability of the sealing system and provide additional time to retrieve and repair the failed liner, failed welds or failed mechanical seal while preventing leakage of the interior fluids to the external environment.

Additional information regarding sealing systems for composite risers is disclosed in U.S. patent application Ser. No. 10/006,324 entitled Redundant Seal Design for Composite Risers with Metal Liners, having as an inventor Mamdouh M. Salama (a co-inventor here) and filed on the same date as this application, the entire disclosure of which is incorporated herein by reference. Helpful background information regarding composite drilling risers is disclosed in the following articles each of which is incorporated by reference herein in its entirety: Composite Risers are Ready for Field Applications—Status of Technology, Field Demonstration and Life Cycle Economics, 13$^{th}$ International Deep Offshore Technology Conference (DOT 2001), Rio de Janeiro, Brazil, Oct. 17–19, 2001: Remaining Challenges of Advanced Composites for water depth sensitive systems, presented at the 2$^{nd}$ Annual Deep Offshore Technology Int. Conf. Held in New Orleans, La. on Nov. 7–9, 2000; OTC 11006: Design Consideration for Composite Drilling Riser, presented at the Offshore Technology Conference held in Houston, Tex. on May 3–6, 1999; SPE 50971: Composite Production Riser Testing and Qualification, SPE Production & Facilities, August 1998 (p. 168–178).

What is claimed is:

1. A multiple sealing system in a composite riser having a liner assembly wherein said multiple seals prevent leakage of internal fluid to the outside of the composite riser and further comprising:
   a liner seal in the liner assembly between a metal to composite interface (MCI) and a liner; and
   an elastomeric seal between the MCI and an elastomeric shear ply provided on the outside of the liner assembly of the composite riser.

2. The multiple sealing system of claim 1 wherein said elastomeric seal prevents leakage of internal fluids to the outside of the composite riser in the event that the integrity of said liner seal or the integrity of the liner is compromised.

3. The multiple sealing system of claim 1 wherein said elastomeric seal comprises an elasomer applied into a groove provided circumferentially along the outer surface of the MCI.

4. The multiple sealing system of claim 3 wherein the liner of the liner assembly comprises an elastomeric liner and said liner seal comprises a bond between the elastomeric liner and an elastomeric material provided in an end of the MCI.

5. The multiple sealing system of claim 3 wherein the liner of the liner assembly comprises a metal liner and said liner seal comprises a weld between the metal liner and the MCI.

6. The multiple sealing system of claim 3 wherein the liner of the liner assembly comprises a metal liner and said liner seal comprises a mechanical seal between the MCI and a transition ring of the liner assembly.

7. The multiple scaling system of claim 3 wherein said elastomer applied into the groove and the elastomeric shear ply are bonded together to form said elastomeric seal.

8. The multiple sealing system of claim 3 wherein said elastomer applied in the groove and the elastomeric shear ply are provided in an uncured state and are cured to form said elastomeric seal.

9. The multiple sealing system of claim 3 wherein said elastomeric seal prevents leakage of internal fluids to the outside of the composite riser in the event that the integrity of said liner seal or the integrity of the liner is compromised.

10. The multiple sealing system of claim 1 further comprising:
   a liner seal in the liner assembly between a metal to composite interface (MCI) and a liner; and
   a plurality of elastomeric seals between the MCI and an elastomeric shear ply provided on the outside of the liner assembly of the composite riser.

11. The multiple sealing system of claim 10 wherein said elastomeric seal prevents leakage of internal fluids to the outside of the composite riser in the event that the integrity of said liner seal or the integrity of the liner is compromised.

12. The multiple sealing system of claim 10 wherein said elastomeric seals comprise an elastomer applied into a plurality of grooves provided circumferentially along the outer surface of the MCI.

13. The multiple sealing system of claim 12 wherein the liner of the liner assembly comprises an elastomeric liner and said liner seal comprises a bond between the elastomeric liner and an elastomeric material applied to an end of the MCI.

14. The multiple sealing system of claim 12 wherein the liner of the liner assembly comprises a metal liner and said liner seal comprises a weld between the metal liner and the MCI.

15. The multiple sealing system of claim 12 wherein the liner of the liner assembly comprises a metal liner and said liner seal comprises a mechanical seal between the MCI and a transition ring of the liner assembly.

16. The multiple sealing system of claim 6 wherein the transition ring comprises part of a continuous tubular liner section in the liner assembly.

17. The multiple sealing system of claim 15 wherein the transition ring comprises part of a continuous tubular liner section in the liner assembly.

18. A method of preventing leakage of internal fluid to the outside of the composite riser having a liner assembly, comprising the steps of:
   providing a multiple sealing system; and
   allowing fluid to flow through the composite riser, wherein said fluid is prevented from leaking to the outside of the composite riser by said multiple seals;
   wherein at least one of said multiple seals comprises an elastomeric seal between a metal to composite interface (MCI) of the liner assembly and an elastomeric shear ply provided on the outside of the liner assembly of the composite riser.

19. The method of claim 18 wherein said elastomeric seal comprises an elastomer applied into a groove provided circumferentially along the outer surface of the MCI.

20. The method of claim 18 wherein at least one of said multiple seals comprises a liner seal in the liner assembly between the MCI and a liner.

21. The method of claim 20 wherein said elastomeric seal prevents leakage of said fluid to the outside of the composite riser in the event that the integrity of said liner seal or the integrity of the liner is compromised.

22. The method of claim 20 wherein said elastomeric seal comprises an elastomer applied into a groove provided circumferentially along the outer surface of the MCI.

23. The method of claim 22 wherein the liner of the liner assembly comprises an elastomeric liner and said liner seal comprises a bond between the elastomeric liner and an elastomeric material provided in an end of the MCI.

24. The method of claim 22 wherein the liner of the liner assembly comprises a metal liner and said liner seal comprises a weld between the metal liner and the MCI.

25. The method of claim 22 wherein the liner of the liner assembly comprises a metal liner and said liner seal comprises a mechanical seal between the MCI and a transition ring of the liner assembly.

26. The method of claim 18 wherein said multiple sealing system comprises a liner seal in the liner assembly between the MCI and a liner and a plurality of elastomeric seals between the MCI and an elastomeric shear ply provided on the outside of the liner assembly of the composite riser.

27. The method of claim 26 wherein said elastomeric seals comprise an elastomer applied into a plurality of grooves provided circumferentially along the outer surface of the MCI.

28. The method of claim 27 wherein the liner of the liner assembly comprises an elastomeric liner and said liner seal comprises a bond between the elastomeric liner and an elastomeric material provided in an end of the MCI.

29. The method of claim 27 wherein the liner of the liner assembly comprises a metal liner and said liner seal comprises a weld between the metal liner and the MCI.

30. The method of claim 27 wherein the liner of the liner assembly comprises a metal liner and said liner seal comprises a mechanical seal between the MCI and a transition ring of the liner assembly.

* * * * *